United States Patent [19]

Haessly

[11] Patent Number: 4,489,229
[45] Date of Patent: Dec. 18, 1984

[54] FLASH BUTT WELDER FOR JOINING FLAT STRIP ENDS

[75] Inventor: Walter F. Haessly, Salem, Ohio

[73] Assignee: The Taylor-Winfield Corporation, Warren, Ohio

[21] Appl. No.: 420,268

[22] Filed: Sep. 20, 1982

[51] Int. Cl.³ .............................................. B23K 11/04
[52] U.S. Cl. ...................................... 219/100; 219/97
[58] Field of Search ................... 219/100, 97, 104, 101

[56] References Cited

U.S. PATENT DOCUMENTS

| 2,286,212 | 6/1942 | Gorn | 219/100 X |
| 2,719,207 | 9/1955 | Moyer | 219/97 |
| 2,794,111 | 5/1957 | Seeloff et al. | 219/97 |

OTHER PUBLICATIONS

Cary, Howard B., *Modern Welding Technology*, (1979), pp. 361, 363-364.

Primary Examiner—C. L. Albritton
Assistant Examiner—Catherine M. Sigda
Attorney, Agent, or Firm—William J. Ruano

[57] ABSTRACT

In a flash butt welder for joining strip ends, the improvement for improving the quality of flash butt welds made in specialty grade steels, such as high strength low alloy, as well as for considerably reducing the upset current requirement, by applying a protective atmosphere of combustible gas, such as propane, natural gas, or hydrogen during the flash butt welding process. Welds free from any detectable defects can be made with lower upset current densities thus extending the equipment welding capacity.

10 Claims, 7 Drawing Figures

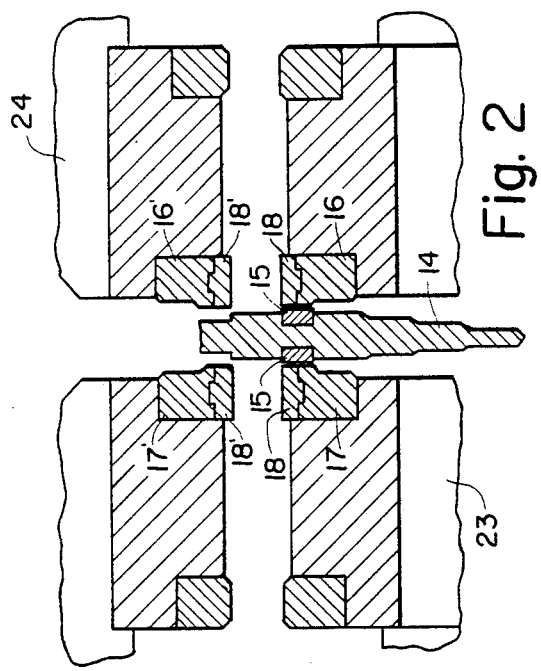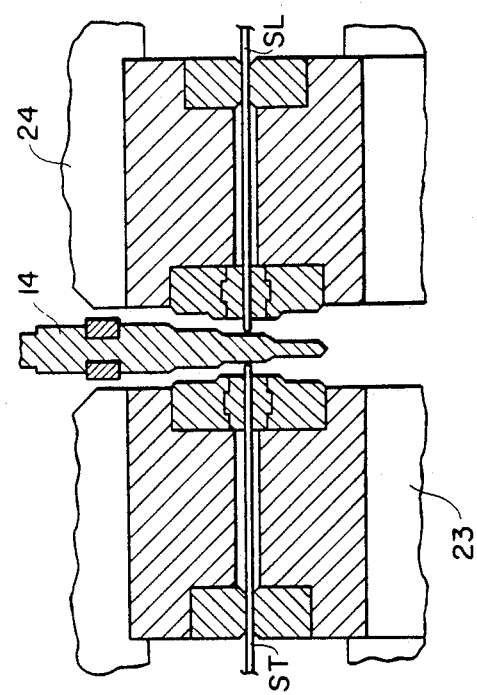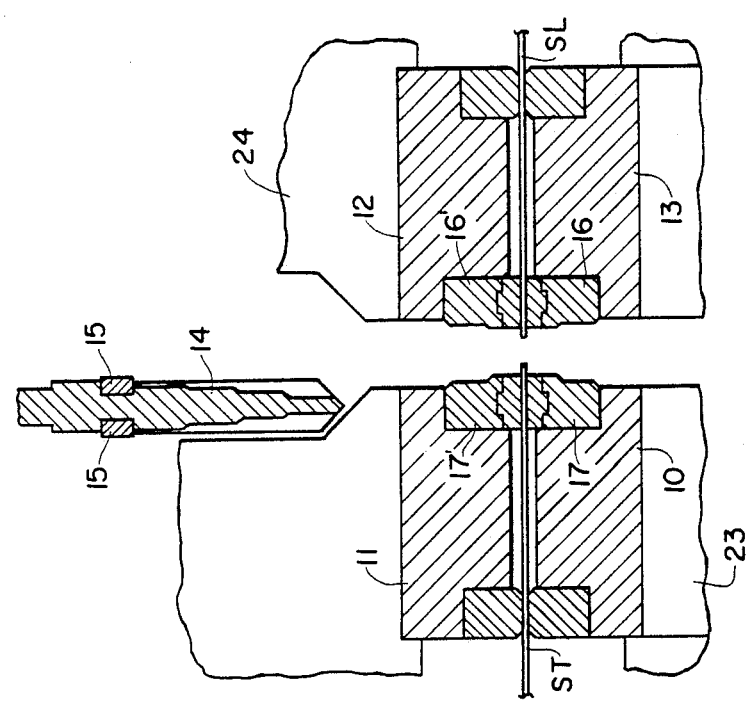

FLASH BUTT WELDER FOR JOINING FLAT STRIP ENDS

This invention relates to flash welding equipment for joining flat strip ends and, more particularly, for improving the quality of flash welds, as well as reducing upset current requirements so as to extend the equipment welding capacity.

The flash welding equipment is not specifically disclosed in the present application but a preferred structure for this purpose is disclosed in Cooper et al. U.S. Pat. No. 3,249,732 dated May 3, 1966 and Seeloff et al. U.S. Pat. No. 2,794,111 dated May 28, 1957, assigned to present assignee. In such patents, the strip ends are moved against a spacer plate in the gap between the two pairs of dies of the flash welding means, which spacer plate is adjusted for the thickness of the strip being welded. The welding dies of the flash welding means are then closed on the strip, separated slightly from each other to allow the spacer plate to be withdrawn, after which the flash welding process is commended. The present invention relates generally to the welding art and more particularly to the provision of improved welding die assemblies for strip joining flash welders.

As will be understood by those skilled in this art, the term "flash welding" is used to designate the method of welding wherein the adjacent edges of two workpieces to be welded are accurately positioned in closely adjacent but spaced parallel relation with respect to each other. The workpieces are then moved relatively toward each other while electrical potential is applied thereto to cause an arc or flashing between the adjacent edges of work pieces to soften the same. The edges of the workpieces are then caused to butt under considerable pressure and high amperage current flows across the butting edges to fuse and weld them together.

During a normal flash welding operation, the current flowing between the edges of the workpieces has a rather low relative value when flashing takes place. When the workpieces are butted, or during "upset" as it is commonly referred to in the art, the current flowing in the workpieces is of a much higher relative value than that evidenced during flashing.

Electrical current related to flashing is commonly referred to as "flashing current". Likewise, current related to upsetting is commonly referred to as "upset current". Also, upset current magnitude related to the cross section being welded is commonly referred to as the upset current density, frequently expressed in terms of "amps per square inch".

When the two work pieces are brought together, a number of tiny contacts will be made. The passage of an electrical current through these contact points will cause the metal contained in the contact portion to heat. A metal bridge of varying resistance throughout its length is formed. As the bridge heats, the metal contained in and around the contact zone reaches the molten state. When the cohesive forces of the metal contained in the now liquid bridge becomes less than the magnetic forces acting on the particle contained in the bridge, the bridge ruptures and the particle flies off in the incandescent state. Craters remain behind on the contact surfaces which were formerly the location of current bridges. Immediately after the first expulsion, the surfaces are again brought into contact by continuous advance of the work, whereupon the cycle repeats at new contact points. The rapid sequence of individual explosions not only causes uniform heating of the contact surfaces but also causes metal evaporation, serving as a protective factor against oxidation.

The basic reason for having outlined the metal bridge theory of flashing is to point out that flashing progesses at localized points and not instantaneously over the complete area being welded. Furthermore, craters are left behind and metal evaporation is the only factor to protect the high temperature surfaces in the craters from becoming oxidized. A further reason is to explain why it is effective for some materials and not so for others. This being that some alloying elements and the extent of their usage causes the material to be more sensitive to oxidation at elevated temperatures.

Strip joining flash welding machines are made to weld the maximum thickness and width of material that a production line is to accomodate. A popular size is the 62 inch machine where maximum strip width is 62 in. and maximum thickness is 0.25 inches. Corresponding maximum weld area for commercial mild steel is 15.5 in.$^2$. The machine would have a maximum clamping capacity of 470,000 lbs. and an upsetting capacity of 175,000 lbs. Maximum welding current is approximately 150,000 amps which is the maximum current available during upset or when the work pieces are forged together. Corresponding upset current density is 9680 amps/in.$^2$. Design limitations make it extremely difficult and costly to obtain welding current much in excess of the indicated amount.

Welding capacity is drastically reduced when welding speciality carbon steel where microalloying elements are used to obtain elevated strength properties. Classification of these grades is commonly referred to as high strength low alloy-HSLA. It appears that metal evaporation explained above is not adequate as a protective factor against oxidation for HSLA grades and a positive supplemental means must be established.

When specific HSLA grades of steel are welded in the ordinary way, that is, without a protective atmosphere, the required upset current density is in the order of 50,000 amps per square inch to minimize defects believed due to oxidation that could cause weld breakage when subjected to subsequent processing. This limits welding capacity of production equipment to approximately 3 square inches based on a maximum available upset current of 150,000 amps.

An object of the present invention is to greatly improve and substantially increase welding equipment capacity by making welds free from any detectable defects with less than half of the upset current density.

Other objects and advantages of the invention will become more apparent from a study of the following description taken with the accompanying drawings wherein:

FIGS. 1-3 are fragmentary sectional views illustrating welder clamp die assemblies and the spacer plate in various operating position;

Figure 4:
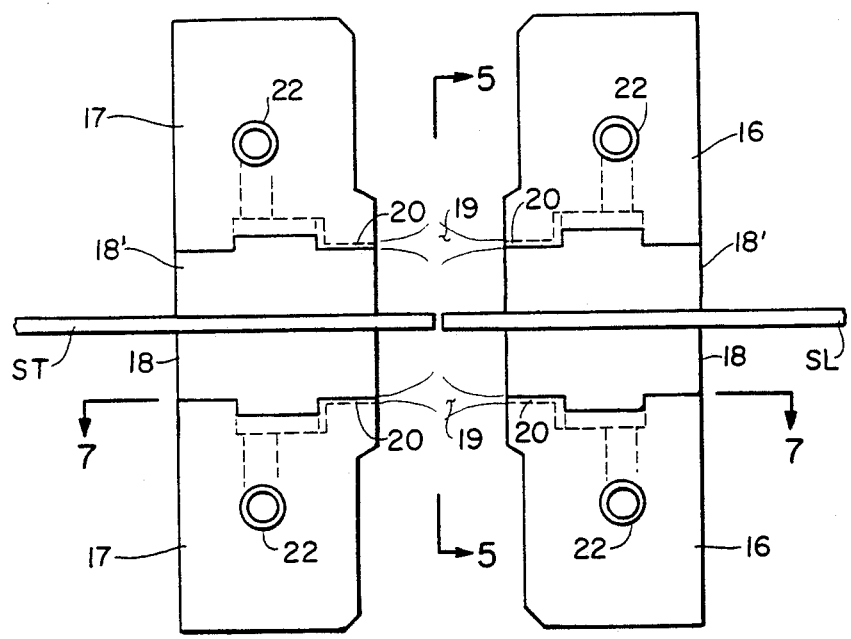
FIG. 4 is an enlarged fragmentary end view showing how clamp dies are made to provide a protective atmosphere during the welding operation according to the present invention.

Referring now to the drawings and initially to FIG. 1 illustrating the clamp die assemblies on a conventional strip welder. Numeral 23 designates the fixed platen on which clamp die assemblies 10 and 11 are mounted for clamping the tail end of strip ST. Numeral 24 designates the movable platen where clamp die assemblies are mounted for clamping the leading end of strip SL. Movable platen 24 is arranged for slidable movement toward and away from fixed platen 23. Spacer plate 14 is shown in its maximum up position where it is located during the weld cycle.

FIG. 2 shows spacer plate 14 in its fully downward position. When the apparatus has reached this position, cutter bars 15 have moved completely across the adjacent faces of clamp dies 16, 16, 17 and 17' including clamp die inserts 18 and 18'. The described movement removes weld flash from clamp die members before each weld is made.

FIG. 3 shows spacer plate 14 moved upwardly a predetermined distance to one of the plurality of gauge faces. Strip ends ST and SL are butted against the gauge faces and clamped for welding.

Figure 5:
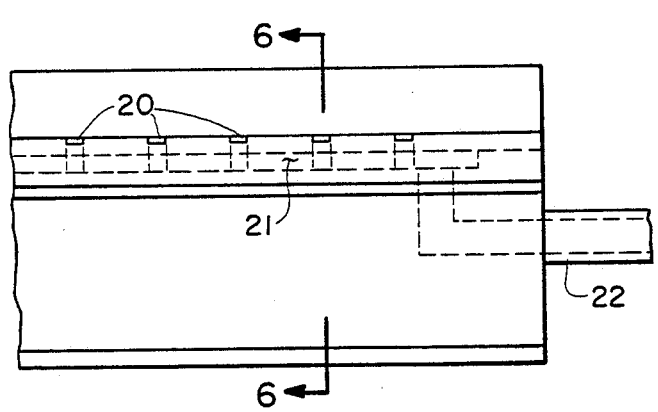
FIG. 5 is a side elevational view taken along lines 5—5 in FIG. 4 showing the lower clamp die and corresponding die insert.
Figure 6:
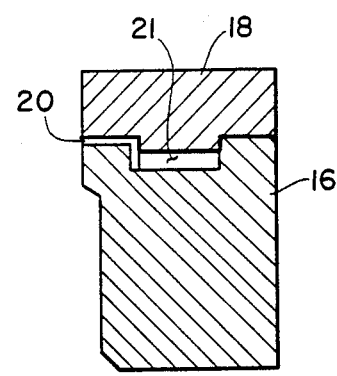
FIG. 6 is a cross-sectional view taken along line 6—6 in FIG. 5.

FIG. 4,5 and 6 show clamp dies 16, 16', 17 and 17' which, in accordance with the present invention, are provided with gas exhaust ports 20 machined in a fashion to join distribution channel 21 which is formed by increasing the depth of the keyway on clamp dies used to locate die inserts 18 and 18'. Pipe connection 22 is provided at both ends of all four clamp dies for supplying gas to distribution channels 21.

Figure 7:
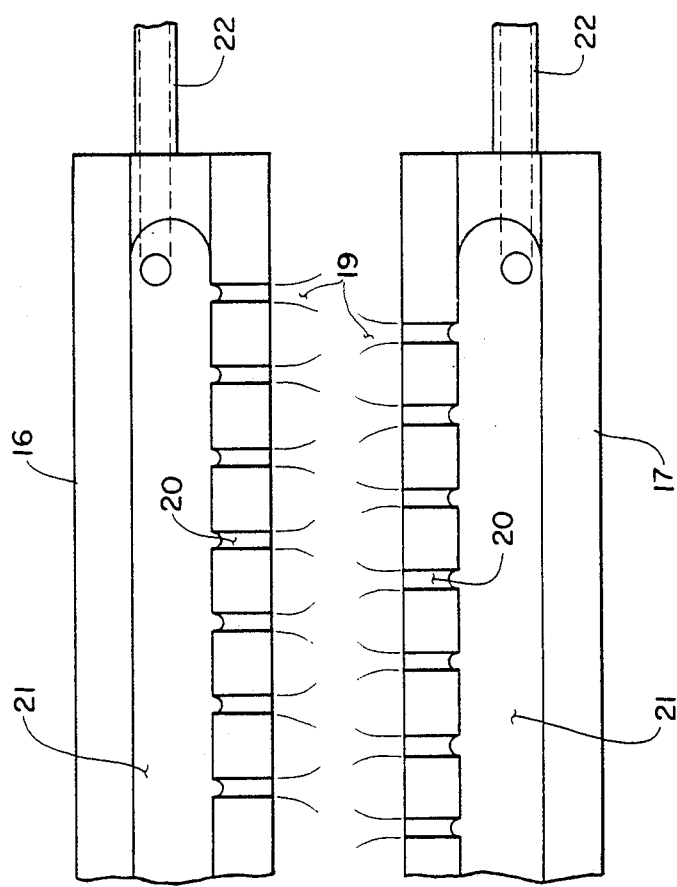
FIG. 7 is a fragmentary plan view taken along section line 7—7 in FIG. 4 thus showing the top of the lower clamp dies without the die inserts.

FIG. 7 shows the preferred arrangement where ports 20 on the lower left clamp die 17 are located so that gas flow 19 is aimed at the midpoint between adjacent ports 20 on lower right die 16. Ports 20 in upper left clamp die 17' are staggered in similar fashion with respect to parts 20 in upper right clamp die 16' as shown in FIG. 4. The reason for staggering opposite ports in the described manner is to get better gas coverage with fewer ports and thereby provide maximum contact area between clamp dies and die inserts to better withstand the high clamping pressure. Maximum contact area is also necessary to transmit high amperage welding current from lower clamp dies 16 and 17 through corresponding die inserts 18 and ultimately into work piece ends ST and SL.

In accordance with the present invention, a combustible gas, such as propane, is fed through gas connections 22 to distribution channels 21 and into a plurality of exhaust ports or outlets 20 so as to provide a protective gas layer along the entire width of the strip ends being welded together, that is, the protective layer is provided both above and below the weld. Ignition of the gas is done by the flashing action, thus establishing the necessary protective atmosphere. While propane gas is indicated, other combustible gasses, such as natural gas or hydrogen, may be used instead.

Rectangular shaped ports, such as 1/16 by ¼ inch, are preferably used to minimize plugging by flash particles. Furthermore, location of the ports as indicated in FIGS. 4,5 and 6 is preferred since any flash particle accumulation tending to partially plug the ports is removed by cutter bars 15 mounted on spacer plate 14 prior to making each weld.

Ports 20 could be cut into the die inserts 18 but the preferred location is in clamp dies 16, 16', 17 and 17'. The reason for the selected location is that die inserts are perishable items and it is therefore more economical to do so in the elected manner.

FIGS. 4,5 and 7 show gas connection 22 being located at the ends of clamp dies 16, 16' 17 and 17' which has been found to work exceptionally well for die lengths up to 64 inches. An alternate arrangement would be at intermediate points along the back side or bottom with corresponding outlet porting in die holders 10, 11, 12 and 13 of FIG 1. A combination of both end and intermediate connection may be found desirable to obtain better gas distribution when the die length is greater than 64 inches.

By using a combustible gas as a protective atmosphere, it was found that welds free from any detectable defects could be made with upset current densities of the order of 20,000 to 25,000 amperes per inch, thus doubling the existing equipment welding capacity.

This compares with flash butt welding without a protective atmosphere of a combustible gas wherein current densities are of the order of 50,000 amperes per sq. inch. This limits welding capacity of production equipment to approximately 3 square inches, based on a maximum available upset current of 150,000 amperes.

While efforts were made to use an inert gas, results indicated that the protective atmosphere must be combustible gas for significantly improved results.

Thus it will be seen that I have provided a novel flash butt welder for joining flat strip ends which greatly improves the quality of flash butt welds made in specialty grade steel, such as high strength low alloy steel by providing a protective atmosphere of combustible gas which greatly reduces upset current requirements, thereby greatly extending the equipment welding capacity.

While I have illustrated and described a single specific embodiment of my invention, it will be understood that this is by way of illustration only and that various changes and modifications may be contemplated in my invention within the scope of the following claims.

I claim:

1. A flash butt welder for joining flat strip ends, including a pair of welding electrodes and a clamp die assembly comprising a pair of clamp dies and clamp die inserts having confronting faces, separated by a horizontal space, the improvement for improving the quality of flash butt welds and for considerably reducing upset current requirements comprising the provision, in said assembly, of gas exhaust ports fed by a combustible gas source for applying a protective gas flame layer above and below the strip ends, said gas flame being ignited by the flashing action of the welding operation, said horizontal space between said dies and inserts being unobstructed in a vertical direction and said electrodes being unenclosed to enable rapid removal of weld flash particles clogging said ports.

2. A flash butt welder as recited in claim 1 wherein said exhaust ports are located at a plurality of locations in said clamp die assembly along the width of the strips being butt welded together.

3. A flash butt welder as recited in claim 1 wherein said exhaust ports are located at a plurality of locations in said clamp dies along the width of the strips being butt welded together.

4. A welder as recited in claim 1 wherein said combustible gas is propane.

5. A welder as recited in claim 1 wherein said combustible gas is natural gas.

6. A welder as recited in claim 1 wherein said combustible gas is hydrogen.

7. A welder as recited in claim 2 together with a spacer plate having outer cutter bars which are vertically slidable along the confronting faces of said clamp die assembly so as to remove weld flash therefrom before each weld is made and thereby remove flash particles tending to plug the exhaust ports.

8. A welder as recited in claim 2 wherein said exhaust ports on one of the confronting dies of each pair are staggered in relationship to those of the other said dies.

9. A welder as recited in claim 1 wherein a space is provided between said dies and inserts to serve as a manifold to feed gas to said exhaust ports, said exhaust ports being vertically staggered relative to said manifold.

10. A method of flash butt welding with a flash butt welder comprising applying a combustible gas stream to the butt weld during the welding operation from a plurality of horizontally spaced exhaust ports above and below the strip ends during welding and igniting said gas stream by flashing action during the welding process.

* * * * *